Dec. 20, 1960     K. A. RUTHERFORD     2,964,858
EDUCATIONAL GAME
Filed Jan. 11, 1960
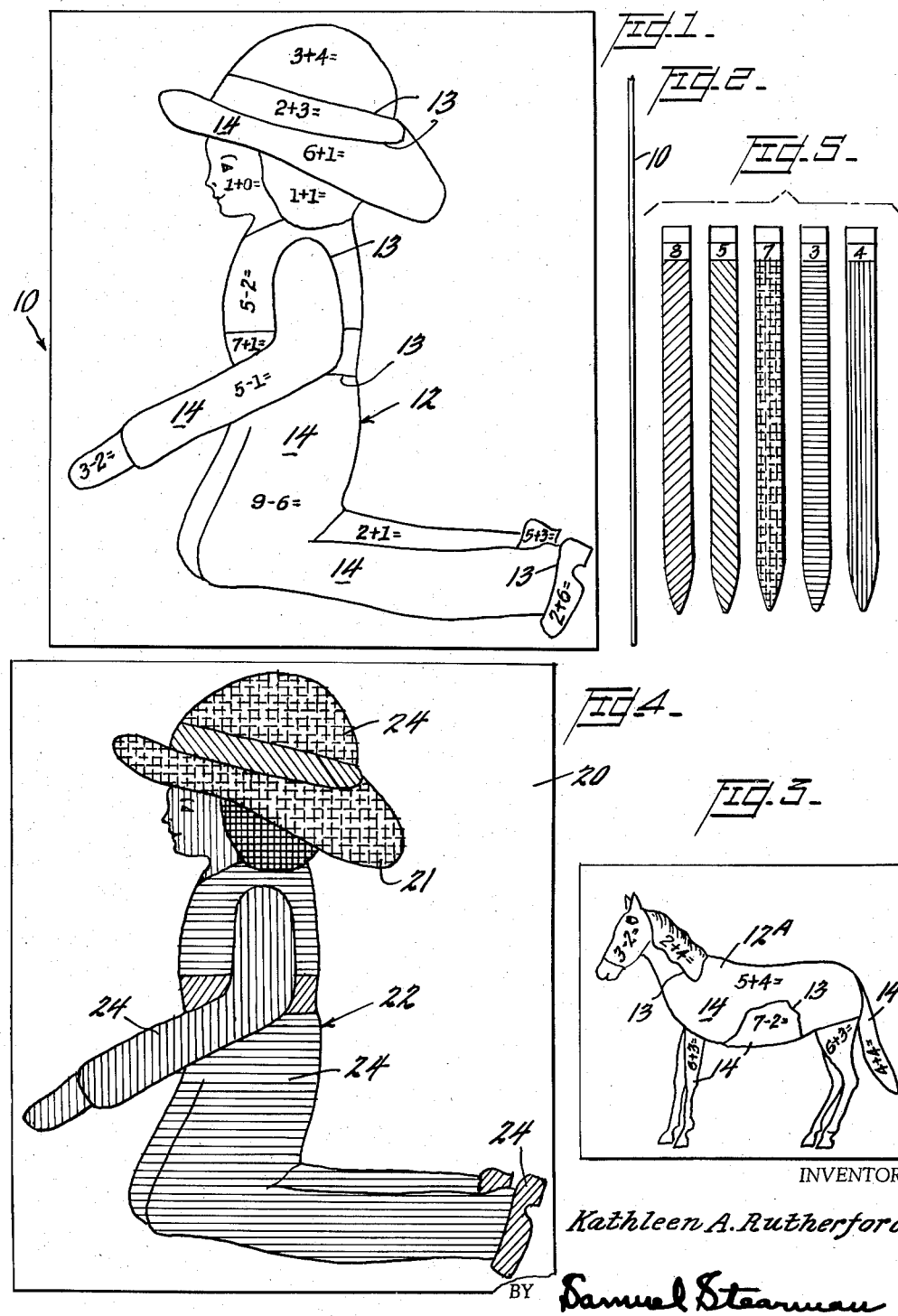
INVENTOR
Kathleen A. Rutherford,
BY Samuel Stearman
ATTORNEY

United States Patent Office 2,964,858
Patented Dec. 20, 1960

2,964,858

EDUCATIONAL GAME

Kathleen A. Rutherford, Peabody St., Groton, Mass.

Filed Jan. 11, 1960, Ser. No. 1,722

8 Claims. (Cl. 35—48)

This invention relates to a game adapted especially for use by young children of pre-school or school-beginning age or children who may be retarded in their ability to learn.

An object of the invention is to provide a game which will enable such children to learn simple arithmetic, spelling, and the like.

Another object of the invention is to provide a device of this character so devised as to retain the interest of the child in learning simple arithmetic, spelling and the like, and at the same time develop the child's ability and improve its dexterity in the use of colors.

Still another object of the invention is to provide a device of this character which can be produced at little cost and furnished for use in the form of a plurality of base sheets presenting problems in simple arithmetic or the like, to be solved by the child. In this way, there is provided opportunity for frequent drill in the solution of the problems, as well as for up-grading the complexity of the problems to be solved by the child.

Still another object of the invention is to provide a device of the character set forth, wherein there may be furnished, as a part thereof, means enabling the child to check itself as to the correctness of its answers to the problems.

Briefly stated, the objects of the invention and the advantages thereof are achieved by means of (1) sheets of paper or the like on which is imprinted, or otherwise formed, the outline of a figure of a human or other animal, or of an inanimate object, the outline being demarked into a plurality of distinct areas, each of which areas is provided with indicia constituting, for example, a problem in simple arithmetic, spelling, or the like, to be solved by the child; and (2) a set of differently colored crayons or other coloring media, each of which is provided with indicia constituting the answer to one or more of the problems presented by the indicia appearing in the demarked areas of the figure outlined on the base sheet.

Thus, in use, if and when the child is able to recognize and distinguish those of the indicia on the coloring media which constitute the respective answers to the problems appearing in the several demarked areas of the base sheet, the child will apply the appropriate coloring to the respective demarked areas in the figure outline on the base sheet.

By providing a number of base sheets in a set, comprising a variety of figures in outline, each variously demarked into separate areas provided with indicia constituting different problems, not only will the interest of the child be aroused and maintained, but the child may be given ample drill or practise in learning simple arithmetic, spelling, and the like.

As will be understood, the indicia in the demarked areas on any one sheet, or on the sheets of a set, may include two or more problems of, say, addition or subtraction having identical answers.

By providing a number of base sheets as a set, as will be preferable in actual commercial practice, the problems presented by the indicia in the demarked areas of the various sheets may be of varying grades of complexity, and the sheets, or sets thereof, carrying indicia presenting the more difficult problems may be made available for use by the child in the more or less progressive order of complexity of the problems.

The objects and advantages of the invention will be more readily apparent from the detailed specification below and from the accompanying drawings, in which:

Fig. 1 is a face view of a base sheet illustrating one embodiment of the invention;

Fig. 2 is an edge view thereof;

Fig. 3 is a view similar to Fig. 1, but on a smaller scale, illustrating another embodiment of the invention;

Fig. 4 is a view showing a check sheet which may be provided, to enable the child to verify the correctness of its answer to the problems it has dealt with in using one of the sheets, such as that shown in Fig. 1; and Fig. 5 is a view showing a group of crayons of different colors, each carrying individual indicia constituting the answer to one or more problems presented in the indicia in the demarked areas of the figure outlined on a base sheet or sheets.

The base sheet, indicated generally by reference numeral 10, is preferably made of a suitable inexpensive grade of paper, cut to rectangular or other desired shape.

Imprinted or otherwise suitably applied to one or both surfaces of the sheet 10, is the outline of a Figure 12, such as the human figure depicted in Fig. 1, or the figure of an animal depicted at 12A in Fig. 3. In lieu of human or animal figures, such as those depicted in Figs. 1 and 3, the base sheets may carry the outline of an inanimate object, as for example, that of a building, or a vehicle or a piece of furniture or the like.

The figure depicted in outline on the base sheet, is demarked, as by means of readily visible imprinted lines 13 into a plurality of areas 14 representing distinct portions of the outlined figure, such as the head or limbs of the depicted animal, or other parts of the figure.

Within the confines of each of the thus demarked areas 14, there are imprinted indicia constituting a problem to be answered by the child. Thus, as illustrated in the drawing, the indicia may present a number of different problems in simple arithmetic, together with, if desired, the "equals" symbol and a question mark.

As many base sheets as desired may be supplied in a set, each sheet of the set being imprinted with, or having otherwise applied thereto, on one or both its surfaces, similar or different figures in outline, each demarked into a plurality of distinct areas, the latter being provided with various indicia presenting different problems, such as those of simple arithmetic, to be answered by the child in the use of the game.

In accordance with the invention, there is supplied, in conjunction with the desired number of base sheets 10 as above described, a plurality of differently colored media, each individually identified by indicia constituting the answer to one or several of the problems presented by the indicia appearing on the base sheet or sheets. In Fig. 5 of the drawing there is shown, for example, a group of differently colored crayons C, each individually identified by a numerical figure constituting the answer to one or more of the arithmetic problems appearing in the several demarked areas of the figure illustrated in Fig. 1.

As will be understood, however, in lieu of differently colored crayons, other suitable types of coloring medium may be employed. Thus, there may be utilized differently colored inks, finger paints, or water color paint tablets, each individually identified by indicia constituting the answer to one or several of the problems shown by the indicia appearing in the various demarked areas of the figure depicted on the base sheet.

In lieu of crayons, inks, or paints as the coloring media, there may be utilized suitable paper or other inexpensive sheet material of different colors, each individually identified by indicia constituting the answer to one or several of the problems appearing on the base sheet or sheets, each of the answer sheets being desirably provided on one of its surfaces with a suitable pressure-sensitive adhesive film. Thus, in use, the child would, if it knows the correct answer, cut from the colored answer sheet which is identified by the indicia constituting the correct answer to a particular one of the problems appearing on the base sheet, a piece of the material of substantially the shape of the demarked area of the base sheet presenting that particular problem, and attach the cut piece of the answer sheet to that demarked area of the base sheet.

In the case of the colored crayons, inks, or paints, the child will, if it knows the correct answer to a particular problem presented by the indicia in the demarked areas of the outlined figure on the base sheet, fill in that demarked area with crayon, ink or paint identified by indicia constituting the correct answer to that particular problem.

If desired, in order to permit the child using the game, to check itself as to the correctness of its answers to the problems presented on any of the base sheets, there may be furnished, as a part of the game, separate check sheets, preferably one for each of the base sheets. In Fig. 4, there is illustrated, for example, a check sheet corresponding to the problem sheet of Fig. 1. As illustrated, the check sheet 20 is imprinted with a figure substantially the same as that shown in Fig. 1, and having distinct areas 24 corresponding to the demarked areas 14 of the problem sheet 10. The various areas 24, of each sheet 20 are imprinted in different colors, corresponding to the color of the several crayons C which carry identifying indicia constituting the correct answer to the several problems presented on one of the base sheets 10. Thus, upon completion of its work with any one or more of the base sheets, the child may readily check the correctness of its answers, by comparing the colors it has applied to the demarked areas 14 of the base sheet, with the colors appearing in the corresponding areas 24 of the check sheet 20.

Desirably, the check sheet or sheets 20 for any given one or more base sheets 10 may be enclosed in a separate sealed envelope, as a part of the game device.

Although the invention has been illustrated in an adaption for use in teaching a child simple arithmetic, it will be evident that the principle of the invention may readily be adapted for teaching a child correct spelling, or other subjects.. Thus, for example, to teach spelling, the base sheet 10 may be demarked into distinct areas, each carrying indicia constituting only some of the letters, say only the consonants, of a word, leaving blank spaces desirably printed in block, at the position of the missing vowel or vowels thereof. The differently colored media may in that case be individually identified by indicia consisting of the vowel letters missing in the partial words appearing in the demarked areas of the base sheet or sheets. Thus, if and when the child knows the full correct spelling of the word, it will apply the color or colors identified by that missing vowel or vowels, at the blank space or spaces in the partial word appearing on the base sheet.

As will be understood, the base sheets 10 may, if desired, constitute the leaves or pages of an inexpensively bound book or pad.

Also, for school use, the base sheets may be furnished in master or multi-copy, to enable a number of children to work separately but simultaneously on the same set of problems, as may be desirable, as for instance in testing their relative knowledge, or their rapidity of arriving at the correct answers to the problems presented on the base sheets.

What I claim is:

1. An educational game of the character set forth, comprising (1) a base sheet having one surface thereof demarked into a plurality of distinct areas, each of said demarked areas carrying indicia comprising numerical digits arranged to present an arithmetical problem to be solved by the user, and (2) a plurality of differently colored coloring media, each of said coloring media being individually identified by indicia constituting the answer to one of said arithmetical problems presented in the demarked areas of the base sheet.

2. A game as defined in claim 1, wherein said coloring media comprises a set of differently colored crayons.

3. A game as defined in claim 1, wherein said coloring media comprises a set of differently colored paints.

4. A game as defined in claim 1, wherein said coloring media comprises a set of differently colored sheets of paper.

5. A game as defined in claim 1, wherein said demarked areas compose the outline of a pictorial figure.

6. A game as defined in claim 1, and including a check sheet having demarked areas corresponding to those of said base sheet, the demarked areas of the check sheet being colored the same as that one of said differently colored coloring media which is identified by indicia constituting the answer to the problem presented by the indicia on the corresponding demarked area of said base sheet.

7. An educational game of the character set forth, comprising (1) a base sheet having one surface thereof demarked into a plurality of distinct areas, each of said demarked areas carrying indicia comprising less than all the letters of a word, arranged to present a spelling problem to be solved by the user, and (2) a plurality of differently colored coloring media, each of said media being individually identified by indicia constituting the answer to one of said spelling problems presented in the demarked areas of the base sheet.

8. A game as defined in claim 7, wherein said demarked areas compose the outline of a pictorial figure.

References Cited in the file of this patent

UNITED STATES PATENTS

| | | |
|---|---|---|
| 1,257,655 | Walden | Feb. 26, 1918 |
| 1,359,646 | Zion | Nov. 23, 1920 |
| 1,428,456 | Stranders | Sept. 5, 1922 |
| 1,480,458 | Mershon | Jan. 8, 1924 |
| 2,585,924 | Freedman | Feb. 19, 1952 |
| 2,825,150 | Steiner | Mar. 4, 1958 |